US006891709B2

(12) United States Patent
Yang

(10) Patent No.: US 6,891,709 B2
(45) Date of Patent: May 10, 2005

(54) SURFACE MOUNTING SURGE ABSORBER AND SURFACE MOUNTING CAP FOR SURGE ABSORBER

(76) Inventor: Bing Lin Yang, Otsu Bldg. 101, 5-6, Sumiyoshi 2-chome, Koto-ku, Tokyo 135-0002 (JP)

( * ) Notice: Subject to any disclaimer, the term of this patent is extended or adjusted under 35 U.S.C. 154(b) by 350 days.

(21) Appl. No.: 09/838,390

(22) Filed: Apr. 19, 2001

(65) Prior Publication Data

US 2001/0030844 A1 Oct. 18, 2001

(51) Int. Cl.[7] .................................................. H02H 9/00
(52) U.S. Cl. ........................ 361/112; 361/117; 361/118; 361/120; 361/111
(58) Field of Search ................................. 361/112, 117, 361/118, 120, 111, 56, 91.1

(56) References Cited

U.S. PATENT DOCUMENTS 5,633,777 A * 5/1997 Boy et al. .................... 361/117
6,392,861 B1 * 5/2002 Trinh et al. ................. 361/117
2002/0075125 A1 6/2002 Yang

FOREIGN PATENT DOCUMENTS

| | | |
|---|---|---|
| JP | 7307192 | 11/1995 |
| JP | 10106712 | 4/1998 |
| JP | 11069662 | 3/1999 |
| JP | 2000268936 | 9/2000 |

OTHER PUBLICATIONS

Canadian Office Action for Application No. 2,344,076 dated Dec. 2, 2003.

* cited by examiner

*Primary Examiner*—Stephen W. Jackson
(74) *Attorney, Agent, or Firm*—Cantor Colburn LLP

(57) ABSTRACT

Surface mounting caps 14 are placed onto both ends of a cylindrical housing 12 of a surge absorber element 10. The surface mounting cap 14 is formed by pressing a phosphor bronze plate, and comprises a cap bottom section 30 and a flange section 16. The flange section 16 grabs the outer peripheral end of the cylindrical housing 12 and lead lines 26 of the surge absorber element 10 are snapped and maintained by a binding section 38 provided at the cap bottom section 30.

4 Claims, 3 Drawing Sheets

SURFACE MOUNTING SURGE ABSORBER AND SURFACE MOUNTING CAP FOR SURGE ABSORBER

BACKGROUND OF THE INVENTION

1. Field of the Invention

The present invention relates to a surface mounting surge absorber and a surface mounting cap for a surge absorber, and in particular to an improved surface mounting surge absorber and surface mounting cap for a surge absorber which can be incorporated onto a printed substrate or the like with high mounting density.

2. Description of the Related Art

High voltage surges such as stray waves, noise, and electrostatic disturbances are deeply-rooted obstacles to the most up-to-date electronic devices. In particular, high voltage pulse waves cause erroneous operations of semiconductor elements in electronic devices, and in some cases, may even destroy the semiconductors or the devices themselves. Various types of surge absorbers are used in order to prevent such high voltages from flowing into the electric devices.

A surge absorber has been disclosed by the inventors which has a simple structure and shows good characteristics, in Japanese Patent Laid-Open Publication No. 2000-268936. With this surge absorber, a wide range of surge characteristics can be covered with an inexpensive structure and a compact shape.

However, when such a surge absorber is to be incorporated onto a printed substrate, the lead lines provided at both ends of the surge absorber are inserted into a through hole of the printed substrate and then soldered. Because of this, in the prior art, the soldering operation of the surge absorber onto the substrate required many steps. Also, because the printed substrate must be provided with a through hole, a two-sided substrate could not be used.

In order to handle the above problem, there is a strong demand for a surge absorber which can be surface mounted. With a surface mounting surge absorber, the incorporation operation onto the printed substrate as described above can be significantly simplified, and such a surge absorber enables the usage of two-sided substrates. Moreover, the overall device can be densified and the surge absorber can be mounted onto the print substrate with high density. Because of this, the surge absorber is advantageous in reducing the size of the electronic devices.

The present invention is conceived to solve the above described problem in the prior art and one object is to provide a surge absorber with a simple structure which can be surface mounted.

SUMMARY OF THE INVENTION

In order to achieve the object, according to one aspect of the present invention, there is provided a surface mounting surge absorber comprising a surge absorber element, constructed by affixing discharge electrodes with lead lines on both internal ends of a cylindrical housing and having a chamber gap within the housing between said discharge electrodes adjusted by the fixed positions of the discharge electrodes so that desired discharge characteristics are obtained, and surface mounting caps placed on both ends of the cylindrical housing, wherein the surface mounting cap comprises a flange section for grabbing the outer peripheral end of the cylindrical housing and acting as a solder receiving section when the surface mounting cap is mounted on a surface, a clear hole to which the lead line is inserted, and a binding section provided around the clear hole for snapping onto the lead line.

According to another aspect of the present invention, there is provided a surface mounting cap to be placed on the ends of a surge absorber element, the surface mounting cap comprising a flange section for grabbing the outer peripheral end of the surge absorber element and acting as a solder receiving section when the surface mounting cap is mounted on a surface, a clear hole to which the lead line of the surge absorber element is inserted, and a binding section provided around the clear hole for snapping onto the lead line.

DESCRIPTION OF PREFERRED EMBODIMENTS

Figure 1:
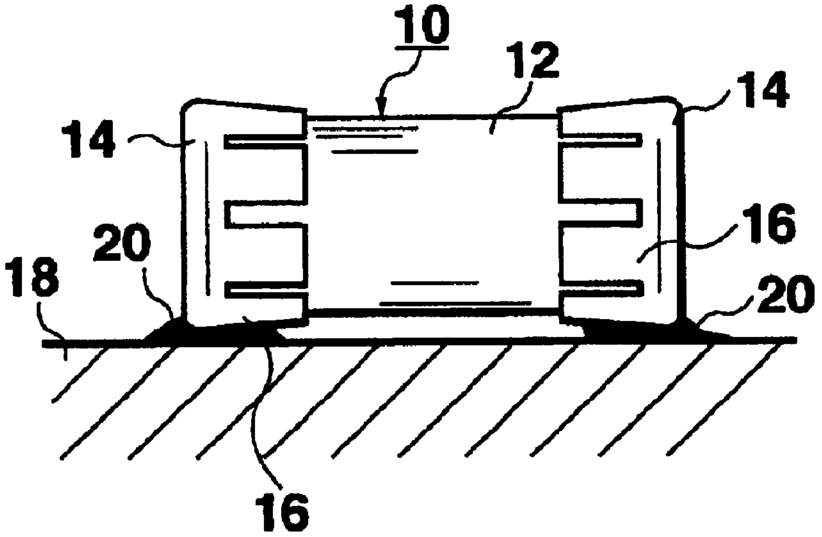
FIG. 1 is a descriptive figure showing a condition where a surface mounting surge absorber according to the present invention is soldered and fixed onto a printed substrate.

FIG. 1 shows a condition where a surface mounting surge absorber according to the present invention is mounted on a printed substrate. The surge absorber element 10 comprises a cylindrical housing 12, as will be described later, and the cylindrical housing 12 is provided with surface mounting caps 14 placed on the two ends. Each surface mounting cap 14 is electrically connected to the discharge electrode of the surge absorber element 10 via a lead line, as will be described later. The surface mounting cap 14 has a flange section 16 for grabbing the outer peripheral end of the housing 12 and acting as a solder receiving section when the surface mounting cap 14 is mounted on a surface. As shown in FIG. 1, both flange sections 16 of the surface mounting caps 14 are firmly fixed and connected to a predetermined wiring section of the print substrate 18 by solder 20.

Figure 2:
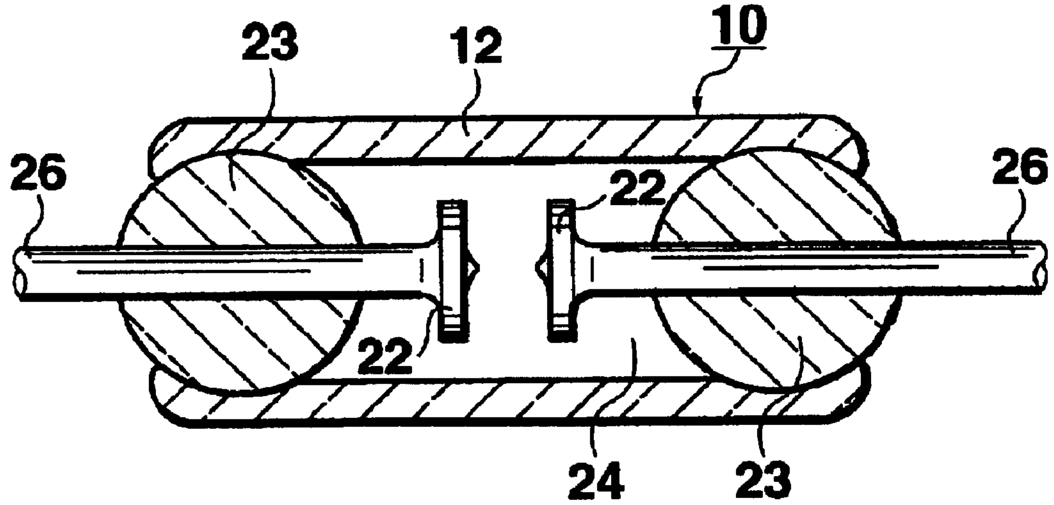
FIG. 2 is a cross sectional diagram of the surge absorber element used in the present invention.

FIG. 2 shows the detailed structure of the surge absorber element according to the present invention. The cylindrical housing 12 is a glass diode container of international standard DO-41 type (with an inner radius of 1.53 mm) and the inner radius is uniform in the axial direction.

A pair of discharge electrodes 22 are inserted to the inside of the cylindrical housing 12, and are molded and fixed to the cylindrical housing 12 via sealing spacers 23. During the molding and fixing operations, the fixed positions of the discharge electrodes 22 within the cylindrical housing 12 can be arbitrarily adjusted to arbitrarily adjust the gap length of the chamber 24 within the cylindrical housing 12, and the desired discharge characteristics, in particular a discharge voltage, can be selected. It is preferable to introduce clean air, a mixture gas of clean air and nitrogen, or a mixture of clean air and an inert gas into the chamber 24. In the embodiment shown in the figure, the discharge electrode 22 is constructed together with a lead line 26. The 20 discharge electrode in the embodiment is constructed by enlarging the radius of the head portion of the lead line 26.

The detailed structure and production method of such a surge absorber element 10 are disclosed in Japanese Patent Laid-Open Publication No. Hei 11-69662. The discharge electrode 22 and the lead line 26 in the present invention can also be separately constructed. In such a case, the discharge electrode 22 and lead lines 26 can be integrated later by welding.

Figure 3:
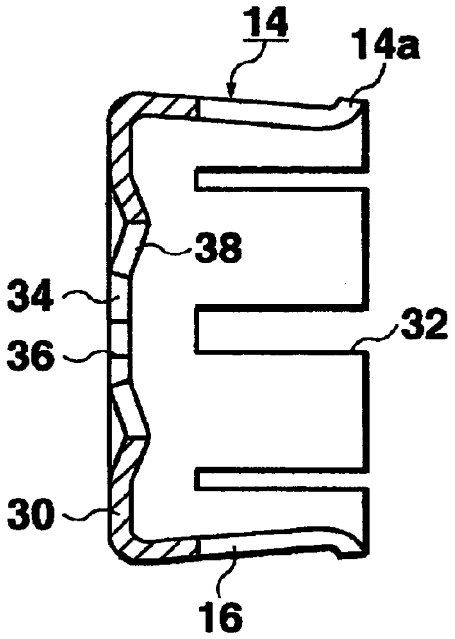
FIG. 3 is a cross sectional diagram showing a preferred embodiment of a surface mounting cap according to the present invention.

FIG. 3 shows a detailed embodiment of the surface mounting cap 14 according to the present invention. In the embodiment, the surface mounting cap 14 is formed by pressing a phosphor bronze plate and the surface mounting cap 14 itself has a springy characteristic, which enables firm placement onto the housing 12 and firm snapping onto the lead line 26, as will be described later.

A number of slits and a clear hole are provided at the phosphor bronze plate by pressing, and the phosphor bronze plate is then processed and formed as shown in FIG. 3 through a plurality of bending or sectional squeezing processes. The surface mounting cap 14 has an overall shape of a cylindrical cap and can be primarily divided into a cap bottom section 30 and a flange section 16.

In the embodiment, eight slits 32 are provided at the flange section 16, the slits being formed by punching the phosphor bronze plate. The punched plate is then bent and squeezed by a plurality of steps and forms a flange section 16 as shown in FIG. 3. The flange section 16 has a shape such that there is a taper from the cap bottom section 30 to the opening section where the inner radius is slightly reduced. As a result, when the surface mounting cap 14 according to the present invention is placed on the end of the cylindrical housing 12 of the surge absorber element 10, because the inner radius at the opening end of the surface mounting cap 14 is smaller than the outer radius of the cylindrical housing 12, the opening end of the cap is widened, causing the surface mounting cap 14 to firmly grab the outer peripheral end of the cylindrical housing 12. In the embodiment, the surface mounting cap 14 itself is elastic and thus, by such a placement assembly, the surface mounting cap 14 can be firmly fixed to the outer periphery of the cylindrical housing 12. As shown is FIG. 3, the opening end of the surface mounting cap 14 of the embodiment is slightly directed out (14*a*) in order to facilitate the placement operation of the surface mounting cap 14 onto the outer peripheral end of the cylindrical housing 12.

Figure 4:
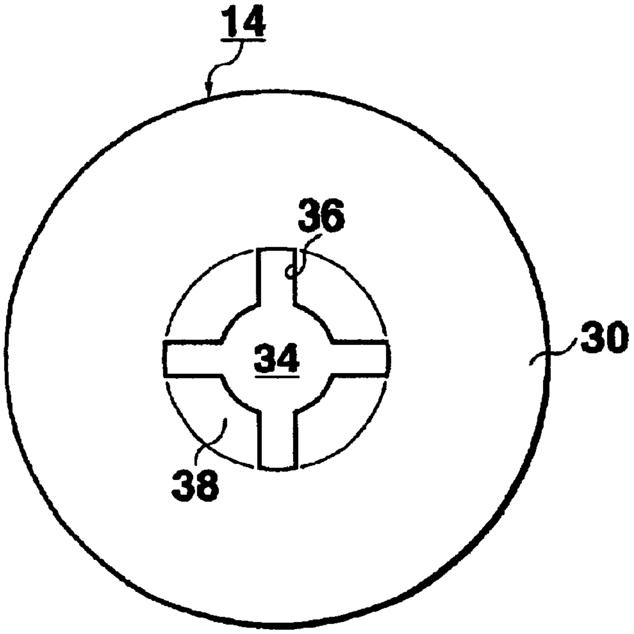
FIG. 4 is a front view of the cap bottom section seen from the axial direction of the surface mounting cap depicted in FIG. 3.

FIG. 4 shows the surface mounting cap 14 seen from the axial direction. As shown, there is provided a clear hole 34 at the center of the cap bottom section 30, to which a lead line 26 of the surge absorber element 10 is to be inserted. The inner radius of the clear hole 34 is set so that it is slightly smaller than the outer radius of the corresponding lead line 26.

As shown in FIG. 4, four slits 36 are provided around the clear hole 34. These slits 36 can be formed by punching a phosphor bronze plate. The slits 36 allow the portion of the cap bottom section 30 remaining around the clear hole 34 to act as a binding section 38 to facilitate insertion of the lead line 26 into the clear hole 34 by slightly opening the inner radius using the springy characteristic when the lead line 26 is inserted into the clear hole 34.

As shown in FIG. 3, the binding section 38 around the clear hole 34 has a taper that slightly opens from the cap bottom section 30 toward the radially outward direction of the cap. As a result, when the lead line 26 is inserted into the clear hole 34 from the side of the flange section 16, the lead line 26 can easily be inserted by slight opening of the clear hole 34 as described above, but when the lead line is pulled toward the inserted direction, the binding section 38 which is present around the clear hole 34 will snap onto the lead line 26 to prevent the movement of the lead line 26 in the direction to oppose the insertion. Therefore, in the surface mounting cap 14 of the present invention, the flange section 16 is firmly placed onto the outer peripheral end of the cylindrical housing 12 and, at the same time, the surface mounting cap 14 and the cylindrical housing 12 are firmly fixed in a condition where the lead line 26 is inserted in the clear hole 34. The surface mounting cap 14 and the cylindrical housing 12 are integrated such that they are electrically and mechanically inseparable.

By cutting the lead line 26 protruding from the surface mounting cap 14 at this point, a surface mounting surge absorber with a surge absorber element 10 and surface mounting caps 14 at both ends of the surge absorber element 10 as shown in FIG. 1 can easily be obtained.

At this point, surface mounting between the flange section 16 of the surface mounting cap 14 and the printed substrate 18 can be easily performed.

According to the present invention, as described, the surge absorber element 10 is a single complete element even before the surface mounting cap 14 is placed, and has lead lines 26 at both ends.

As a result, according to the present invention, various processes for stabilizing the surge absorber element 10, such as, for example, aging, and heat and chemical stabilization processes can be easily performed on the surge absorber element 10 itself before the surface mounting cap 14 is placed. This is due to the fact that the surge absorber element 10 has the lead lines 26 at both ends. It is advantageous that the connection between the lead lines 26 and the terminals of the processing devices is simple in each of the processing steps described above. Similarly, in addition to the processing steps, the existence of the lead line 26 is very useful when checking the performance or sorting the products according to the measurement results.

Figure 5:
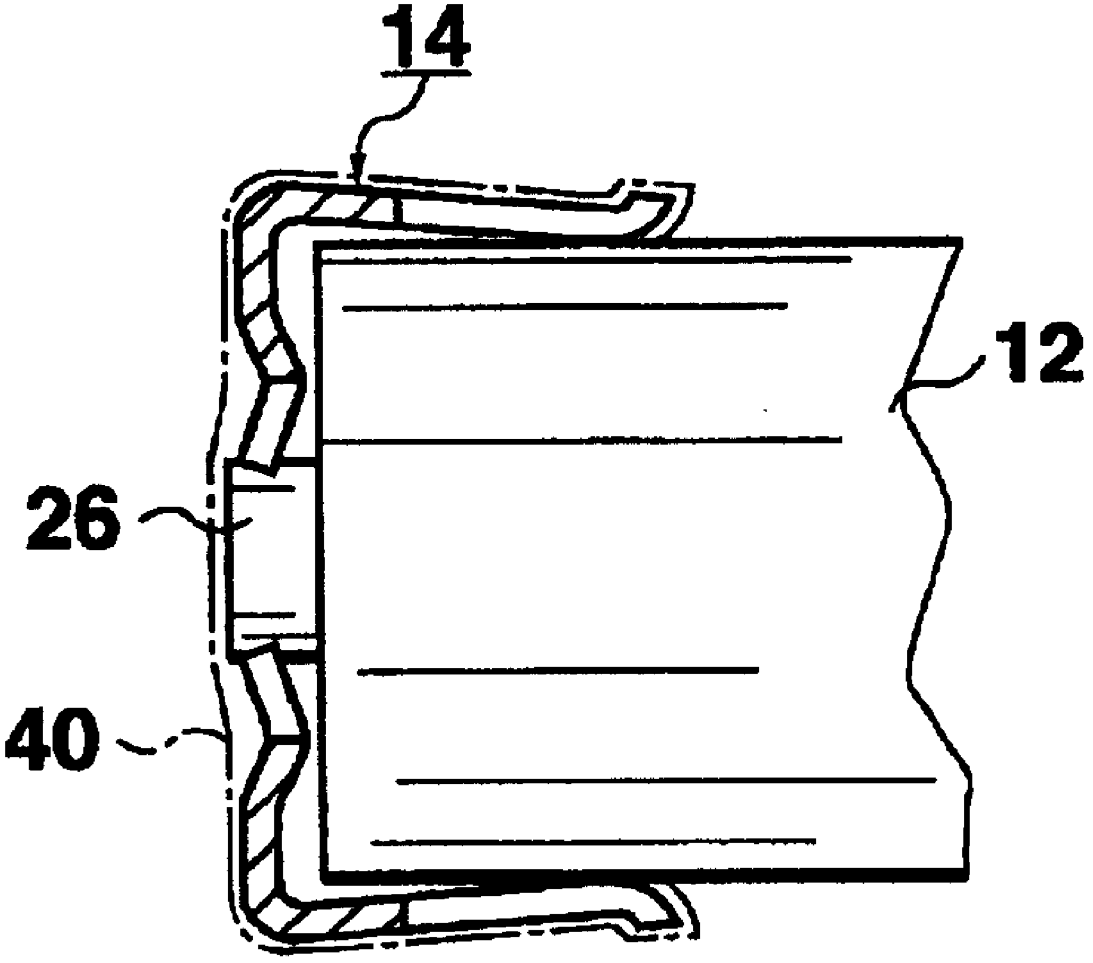
FIG. 5 is a cross sectional diagram showing a condition where coating is applied to the surface mounting surge absorber according to the present invention.

As described, according to the present invention, the surface mounting cap 14 and the surge absorber element 10 can be easily coupled. In order to further stabilize the integration between the two components, it is also preferable to apply a coating process to the surge absorber with the surface mounting caps 14 placed onto the cylindrical housing 12 of the surge absorber element 10, as shown in FIG. 5. In FIG. 5, the coating section is shown by a reference numeral 40, and it can be understood that the integration between the lead line 26 and the surface mounting cap 14 is significantly strengthened.

In the described embodiment, the shape and number of the slits 32 and 36 provided at the flange section 16 or at the cap bottom section 30 can be arbitrarily selected. In particular, because the length of the slit 32 affects the placement strength between the surface mounting cap 14 and the surge absorber 10, the length should be experimentally determined.

In the described embodiment, the inner radius of the cylindrical housing 12 is 1.53 mm, but this size can arbitrarily be set in the present invention, and according to the experiments by the inventors, cylindrical housings of 1.66, 1.80, 2.3, 2.6, 3.1, and 6.8 mm are realized.

The surface mounting cap 14 is formed from phosphor bronze, but any other steel plate can be used.

As described above, according to the present invention, a conventional surge absorber element with lead lines can be used as a surface mounting surge absorber by a simple structure, and the present invention provides a significant improvements in densifying and the assembly of the electronic devices.

What is claimed is:

1. A surface mounting surge absorber comprising:

a surge absorber element, constructed by affixing discharge electrodes with lead lines on both internal ends of a cylindrical housing, and having a chamber gap within the housing between said discharge electrodes adjusted by the fixed positions of said discharge electrodes so that desired discharge characteristics are obtained; and surface mounting caps placed on both ends of said cylindrical housing; wherein said surface mounting cap comprises:

a flange section for grabbing an outer peripheral end of said cylindrical housing and acting as a solder receiving section when said surface mounting cap is mounted on a surface;

a clear hole to which said lead line is inserted; and a binding section provided around said clear hole for snapping onto said lead line.

2. A surface mounting surge absorber of claim 1, wherein said surface mounting cap is constructed from a material with springy characteristics.

3. A surge absorber of claim 1, wherein a plurality of slits are provided at said flange section of the surface mounting cap.

4. A surface mounting cap to be placed on the two ends of a surge absorber element, said surface mounting cap comprising:

a flange section for grabbing an outer peripheral end of said surge absorber element and acting as a solder receiving section when said surface mounting cap is mounted on a surface;

a clear hole to which a lead line of said surge absorber element is inserted, said lead line is connected with an electrode within a housing; and a binding section provided around said clear hole for snapping onto said lead line.

* * * * *